United States Patent [19]
Brush, II et al.

[11] Patent Number: 6,023,270
[45] Date of Patent: Feb. 8, 2000

[54] DELIVERY OF OBJECTS IN A VIRTUAL WORLD USING A DESCRIPTIVE CONTAINER

[75] Inventors: Abbott Purdy Brush, II, Woodbridge, Conn.; Christopher Arnell Surtees Gage; David Bruce Lection, both of Raleigh, N.C.; David Allen Schell, Durham, N.C.

[73] Assignee: International Business Machines Corporation, Armonk, N.Y.

[21] Appl. No.: 08/971,535

[22] Filed: Nov. 17, 1997

[51] Int. Cl.[7] ........................................ G06F 15/00
[52] U.S. Cl. .............................................. 345/333
[58] Field of Search ................................. 345/473, 333, 345/334, 339, 348, 349, 350

[56] References Cited

U.S. PATENT DOCUMENTS 5,847,707  12/1998  Hayashida ............................... 345/348

Primary Examiner—Phu K. Nguyen
Attorney, Agent, or Firm—Jeanine S. Ray-Yarletts

[57] ABSTRACT

A method and apparatus for encasing one or more virtual objects in a container for delivery in a virtual world. The container can be opened by automatic time-out, simple manual opening or security-enforced manual opening. The container can hide all or part of the virtual objects, filter events to or from the objects, present advertising information, group multiple objects and enforce access security checkpoints.

45 Claims, 6 Drawing Sheets

DELIVERY OF OBJECTS IN A VIRTUAL WORLD USING A DESCRIPTIVE CONTAINER

I. RELATED APPLICATIONS

The present application is related to U.S. patent application Ser. No. 08/746,695, entitled "Communication Between Intelligent Virtual Objects," filed on Nov. 14, 1996 and U.S. patent application Ser. No. 08/746,694, entitled "User Interaction with Intelligent Virtual Objects," filed on Nov. 14, 1996.

II. FIELD OF INVENTION

The present invention is related to, but not limited to, the traversal of the Internet, also known as the world wide web. It specifically relates to the interaction of users of the world wide web using proxies or representations of the user in a simulated or virtual world and delivery of objects within that world.

III. BACKGROUND OF THE INVENTION

In recent history, computers have become much more pervasive in society. In addition, they have become more powerful, faster and have significantly more storage than they did just a few short years ago. These exponential increases in speed, storage and processor power have provided the necessary infrastructure for computers to network together effectively.

The most publicized computer network in existence is referred to as the Internet. The Internet is a connection of computers using the TCP/IP protocol. This has evolved into what is now referred to as the world wide web which provides a somewhat cognitive interface into the Internet. The world wide web allows users to access information by indicating the location of the information which they desire to retrieve or by traversing hyper-text links which cross-reference information in many different locations. This is made possible by the implementation of a universal resource locator (URL) as a way of locating information on the world wide web.

Many products have been developed which assist the user in searching the web for information. Access to the world wide web can be accomplished very inexpensively using a phone line, an inexpensive computer and a software program called a web browser such as Netscape's Navigator®. This ability to inexpensively connect into the world wide web has encouraged its use for much more than business purposes. The world wide web is used for educational research, shopping, games, making reservations, trading stock and numerous other purposes. Children, as well as adults, are frequent users of the world wide web.

While it was the advent of two dimensional graphically intense web sites that spurred the popularity of the Internet, the next level of technology may bring Internets, internal networks such as intranets, and networks in general to a new level. The intent of this phase of Internet development has been to render web sites sensually. That is, a user interacts with or exists within a site and experiences and perceives the site from within. This is referred to as Virtual Reality and is intended to perceptualize the network or to have the network rendered to humans with more of their senses. It puts the user in the center of the Internet.

While Virtual Reality is still in its infancy, it traditionally uses computer simulations containing three-dimensional (3D) graphics and devices to allow the user to interact with the simulation. Much of what the user has been able to browse as "data" on the web may be able to be 'experienced' as a 3D web site in the future. 3D web sites are constructed with a Virtual Reality Modeling Language, herein referred to as VRML, which allows for the design and implementation platform-independent scene descriptions. VRML is a file format for describing interactive 3D objects and worlds to be experienced on the world wide web utilizing HTTP (A HyperText Transfer Protocol used on the Internet) in its implementation.

In today's virtual reality environments when a user enters a virtual world they take on a character persona known as the user's avatar. While the user is present in the world the user sees through the eyes of the avatar as they communicate with other avatars. The user can also signal the avatar to execute a range of emotions or actions that are viewable by any avatars looking their direction. Such actions could be waving hello or could involve handing a virtual object to another user. When objects are delivered in a virtual world, currently they are delivered with the appearance created by the object's or world's author.

Given the direct appearance of objects exchanged in a virtual world there is no simple method to hide the object's appearance or deliver additional information about the object or its owner. As virtual worlds come to mirror the physical world, the ability to hide objects until the receiver satisfies some security check is becoming more and more desirable. Further, it would be advantageous for an object container to communicate information to a user in forms similar to advertisements or copyright descriptions. The state of virtual world designs today do not offer these capabilities.

IV. SUMMARY OF THE INVENTION

The present invention addresses the inability to hide the appearance of a virtual object by wrapping it in a visual encasement or container. Upon complete delivery of the object, programming included with the object can then delete the container allowing the object to operate and be viewed normally in the world. The present invention defines three methods for triggering the deletion process: timed deletion, manual deletion and secured deletion. The present invention also defines four types of container usage: visibility, filtering, information and security.

Timed deletion of an object container, as defined by the present invention, allows the receiving user (receiver) to automatically remove the container once they receive the object. An attribute of the container would be a time period after delivery to wait before dissolving. Once the timer expires the object inside the container would become accessible even though the receiver took no action to remove it.

Manual deletion of an object container, as defined by the present invention, is more analogous to real-life delivery of objects whereby the receiver must take some action to remove the object from its container. For example, when a receiver clicks on the container it would dissolve to reveal the object it contained. As discussed later, this approach is desirable when the container is used in an advertising mode and the receiver must interact with the container before viewing its contents.

Secured deletion of an object container, as defined by the present invention, is an extension of manual deletion that incorporates the use of a security check to protect access to a container's contents. Instead of simply clicking on a container to open it, the receiver must satisfy some security check, such as a password, visual puzzle or copyright agreement, to access the object.

The present invention also defines deletion combinations that provide greater control for delivering objects. An example using manual deletion after some time interval is a birthday present. A present could be supplied with a timer that would not allow opening until the receiver's birthday. Once the birthday arrives the receiver could then click the container to access its contents.

Visibility usage, as defined by the present invention, encases a virtual object in a manner that controls whether the receiver can view the object while in the container. An example of where this is appropriate is a birthday present delivery with the lone goal of keeping the virtual object hidden from the receiver. The present invention defines three visibility modes: opaque, window and translucent. Opaque mode completely hides the contents of the container. Window mode allows a portion of the object to be seen similar to real-world window envelopes. Translucent mode allows full view of the objects inside the container similar to a real-world sandwich bag. The key element of this usage is controlling the visibility of the contents of a container.

Filtering usage, as defined by the present invention, encases a virtual object in a manner that controls whether the receiver can manipulate the object while in the container. The present invention defines this usage in a flexible manner that allows for container-specific decisions on which events to allow in or out of the container. A container implemented using the present invention could decide which events to pass on to container occupants and which events from container occupants to display externally. An example of this usage could be a container for a virtual puppy. The container could decide whether to display movements of the puppy inside the container. The container could also decide whether to allow the puppy to hear a receiver talk to it through the container. The key element of this usage is controlling the interaction with contents of a container.

Information usage, as defined by the present invention, uses a container that presents messages when viewed by the receiver. The messages can involve an abstract of information such as an owner's name or a copyright statement, but they can also be used in a manner analogous to shopping bags which advertise the store's name. The key element of this usage is the delivery of information by the container that can be related to the virtual object inside, but need not be.

Security usage, as defined by the present invention, incorporates secured deletion as discussed above to allow secured delivery of objects. When used for this purpose, virtual objects would only be accessible once the receiver satisfied the security check provided by the container. This allows an object to be delivered without regard to security because the container could ensure only authorized receivers can access the virtual objects inside. In addition, the security usage can perform cryptolope functions by encrypting the contents until proper security checks are performed. The key element of this usage is the ability to control access to virtual objects through the security functions of the container.

In all of the methods defined by the present invention it is important to note that such interaction is defined for first-person experience. Thus, other avatars may view an avatar-container interaction without witnessing the same visual or filtering affects as the avatar interacting with that container. This is an important yet subtle benefit of the present invention. In this way for example, an avatar is able to open a secure container and view the contained object without the rest of the virtual world participants seeing as well. With the relative viewing capability as defined by the present invention virtual worlds can implement management schemes that provide access in a regulatory manner with ordinary users and administrators seeing different results.

DETAILED DESCRIPTION OF THE PREFERRED EMBODIMENT

The preferred embodiment of the present invention is implemented using VRML in a virtual world. An avatar is implemented to represent user, or one or more aspects of a user, in a virtual world. An example used in describing virtual containers is one where a user goes shopping on the Internet through the use of an avatar in a virtual shopping mall. The virtual world of the preferred embodiment is a shopping mall, although a virtual world could be created to be any perceived world; both those mimicking our reality and those of science fiction.

Figure 1:
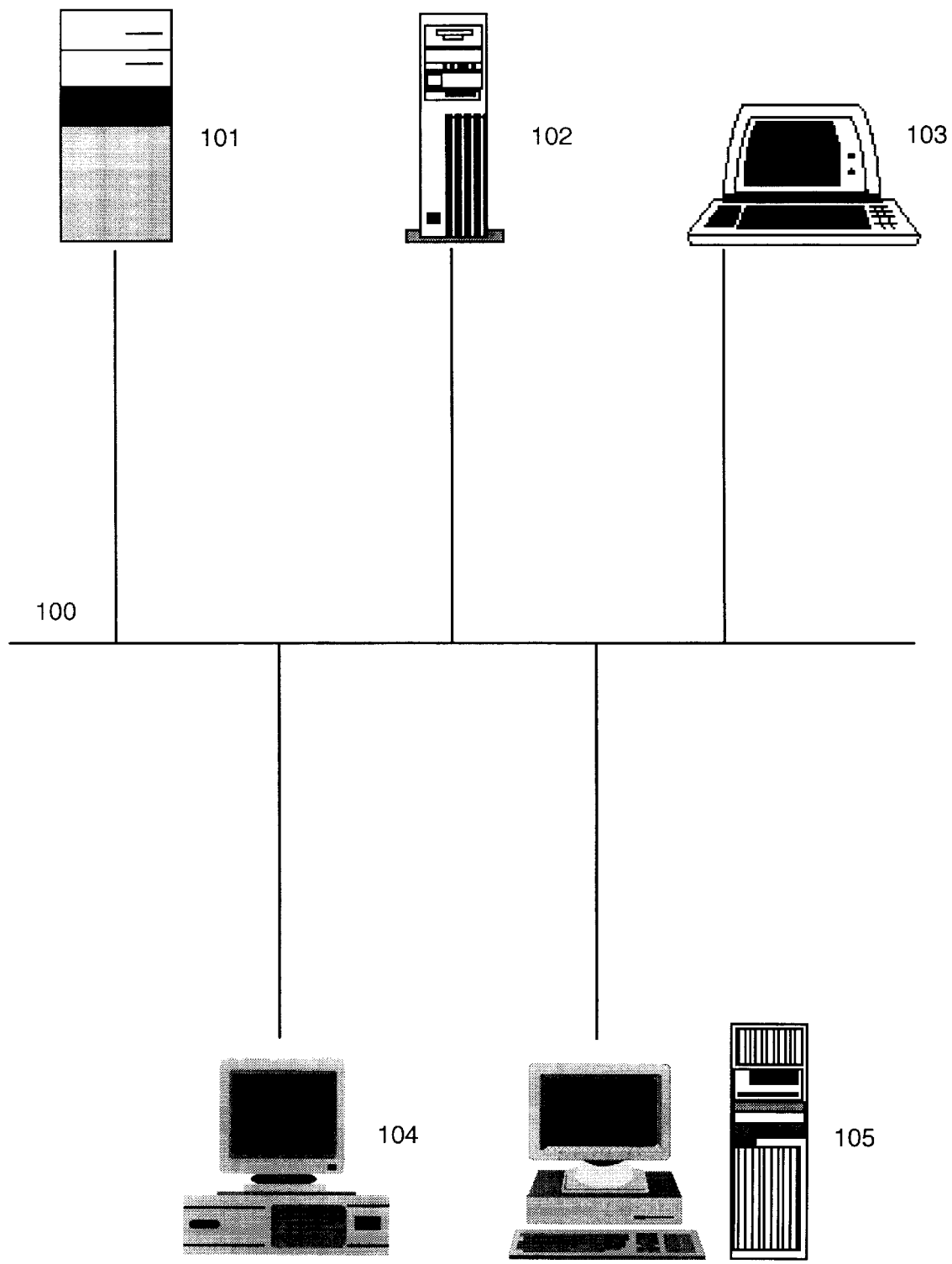
FIG. 1 demonstrates a sample network and virtual world spread over multiple physical servers in which the present invention is implemented.

The virtual shopping mall contains many stores which, in the present implementation, physically reside on multiple servers within the Internet. An example of this is shown in FIG. 1. In our example, the computer labeled 101 is the client computer used by a user (USER1) for accessing the world wide web as depicted by 100. USER1 created an avatar (AVATAR1) for use in traversing a virtual world. A subset of the world-wide web is depicted by enumerated servers 102–105. In the present example server 102 contains a hardware store, server 103 contains a drug store, a card shop and a florist, and a department store is split between servers 104 and 105. As is shown by this example, a single store or a single virtual world can reside across multiple servers which may physically reside in multiple locations.

Figure 2:
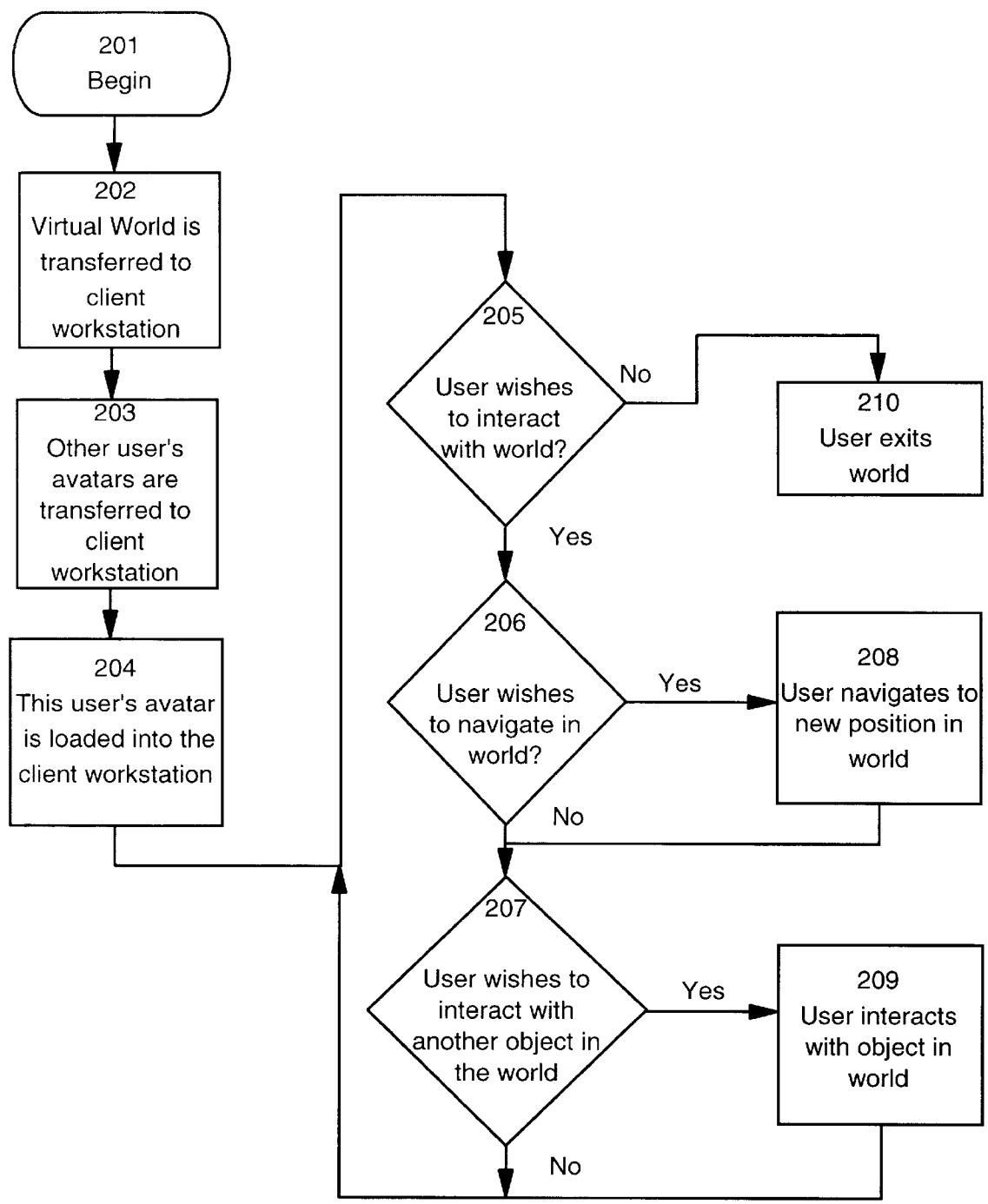
FIG. 2 depicts the prior art flows required to interact with a virtual object in a virtual world.

The present invention focuses on AVATAR1 and the processes necessary to interact with objects in a virtual world. FIG. 2 demonstrates prior art of how a virtual world is presently traversed involving direct object interactions. The process begins with USER1 accessing a virtual world, for example a hardware store, with AVATAR1 in step 201. In step 202, the virtual world is transferred to USER1's client workstation which allows for visual representation of the world. In step 203, any avatars in the same virtual world are transferred to USER1 's client workstation. Now that the world and other avatars have been transferred, step 204 proceeds to load AVATAR1 into the client workstation.

Generally there are two decisions which bound USER1's activities in the virtual world: whether to navigate and whether to interact with an object. Doing either of these is considered interaction with the virtual world. Decision step 205 determines whether USER1 wishes to interact with the world. If not, USER1 exits the world in step 210. If however, USER1 does want to interact with the world then decision step 206 determines if the interaction involves navigating in the world. If so, USER1 navigates AVATAR1 to a new position and the world reflects that change of location in step 208. The other possibility for interaction is tested at step 207 which determines whether USER1 wishes to interact with another object, for example a bicycle horn, in the world. If so, USER1 interacts directly with the bicycle horn in step 209, which could generate a honking sound. The processing of steps 207 and 209 present the prior art function that has been enhanced by the present invention. The enhancements by the present invention are discussed in FIG. 3. Once navigation and object interaction have completed, decision step 205 again determines whether USER1 wants to further interact with the world. Once no further interactions are desired USER1 exits the world in step 210.

Figure 3:
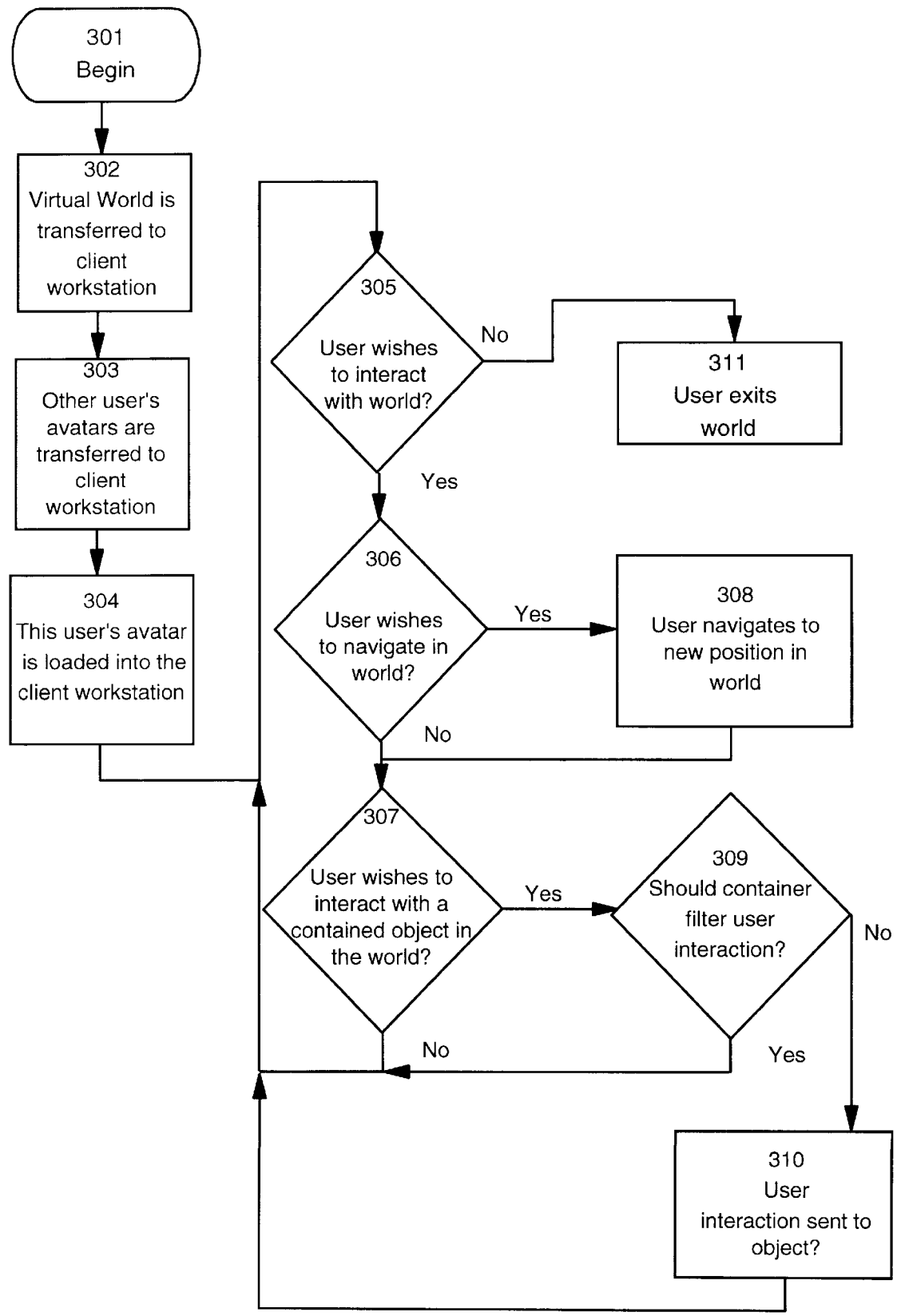
FIG. 3 depicts the flows required to interact with a virtual object in a container from the present invention in a virtual world.

FIG. 3 demonstrates a similar scenario but in a world that implements the present invention. The key enhancement with the present invention is the ability to place objects into containers which affect visibility and interaction with the object. Steps 301 and 302 represent USER1 accessing a virtual world, for example a hardware store, and transferring it to USER1's client workstation. With the present invention, some of the objects transferred in step 302 can be containers of other objects. Therefore, in the hardware store example a bicycle horn object may exist inside a container object which looks like a bag. This differs from the prior art and the effects are discussed later in this figure. Steps 303 and 304 proceed to load other user avatars and AVATAR1 to USER1's client workstation.

As in the prior art, a decision step (305) determines whether USER1 wishes to interact with the world. If not, USER1 exits in step 311. If USER1 wishes to navigate in the world (306), the new position is determined and AVATAR1 is moved accordingly in step 308. Decision step 307 then determines whether USER1 wishes to interact with an object in the world. For example, USER1 may wish to squeeze the bicycle horn which is currently inside a bag. If USER1 attempts to interact with the bicycle horn, decision step 309 must determine if the bag is a container object which filters such interaction events. A key distinction is that the bicycle horn no longer directly receives interaction events, but instead has all such events monitored by its container. This filtering process is a significant portion of the present invention and is described in further granularity in FIG. 4. If the interaction is not filtered out, in step 310 the container forwards the interaction event to the bicycle horn inside the bag which could react with a honking sound. If however, the bag is filtering such interaction events then the bicycle horn never receives the interaction and processing returns to decision step 305 ready for further interaction. If USER1 no longer wishes to interact with the world, exit processing occurs at step 311.

The filtering capability generally described in FIG. 3 is a significant advancement over existing object representations in virtual worlds.

Figure 4:
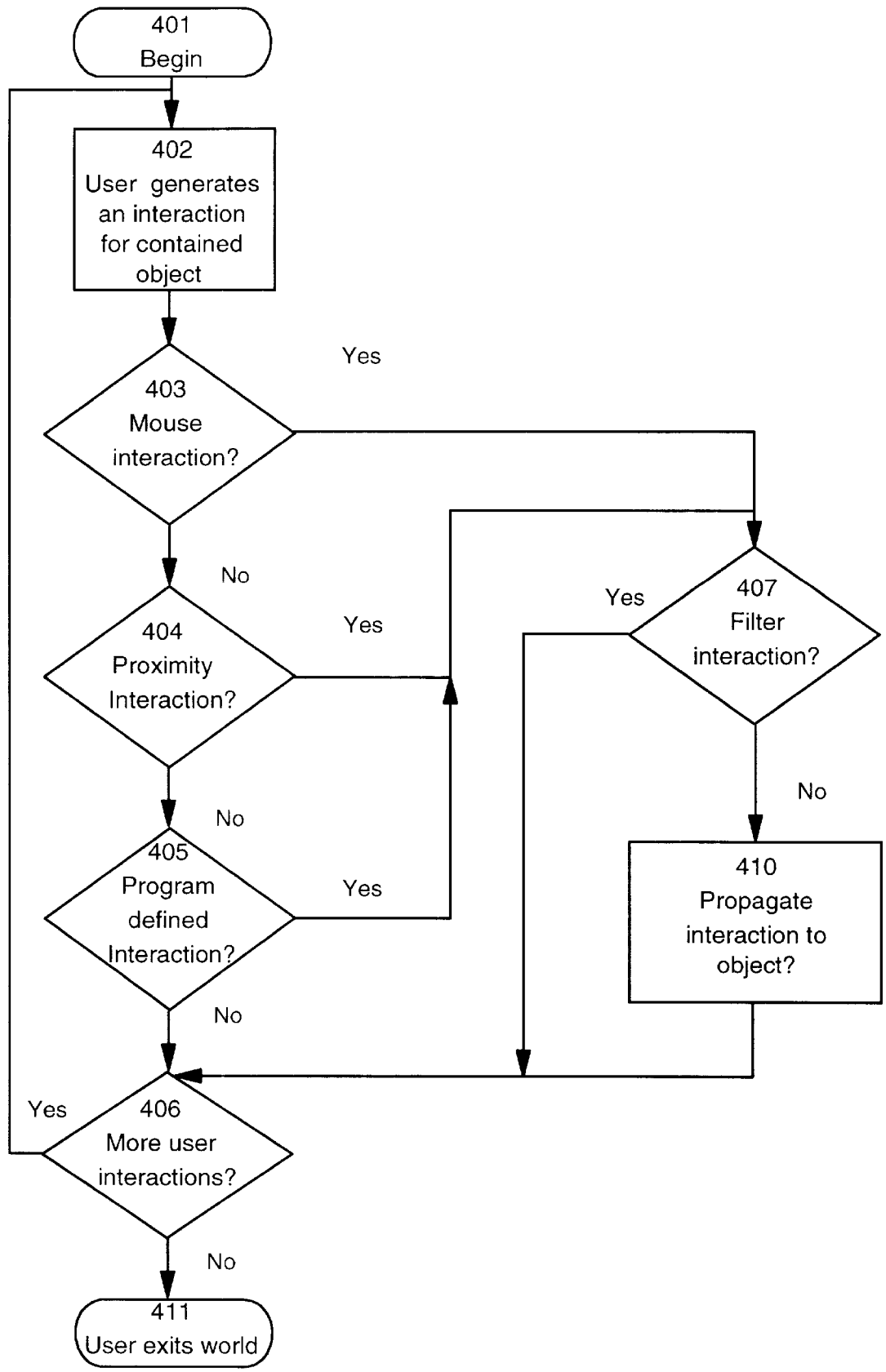
FIG. 4 depicts the flows required to filter events from an avatar to an object within a container.

FIG. 4 presents a detailed sequence of filtering functions a container object performs. Step 401 begins with USER1, through AVATAR1, interacting with objects in a virtual world. In step 402, USER1 generates an interaction on a container object that contains another object. For example, USER1 is again attempting to interact with a bicycle horn closed inside a bag container. Mouse clicks or other pointing device interactions by USER1 on the contained object are monitored by decision step 403. If such interaction is detected then step 407 determines if the mouse interaction should be filtered. If not, the interaction event is forwarded to the bicycle horn (410) which could respond with a honking sound.

This same filtering determination is performed for proximity interactions in step 404. Proximity sensors which generate events for virtual objects when an avatar gets within a certain distance can also be filtered by a container. Thus, decision step 407 would decide whether to forward the proximity event to the bicycle horn. Additionally, there are a multitude of program-defined interactions that may generate an event to be received by a contained object. If a program-defined interaction event is detected at step 405, decision step 407 determines whether to forward the event to the contained object. If the event is not filtered then the container forwards it to the contained object. Regardless of whether events were filtered or not, decision step 406 determines if there are further USER1 interactions to monitor. If there are none, USER1 exits the world in step 411.

Figure 5:
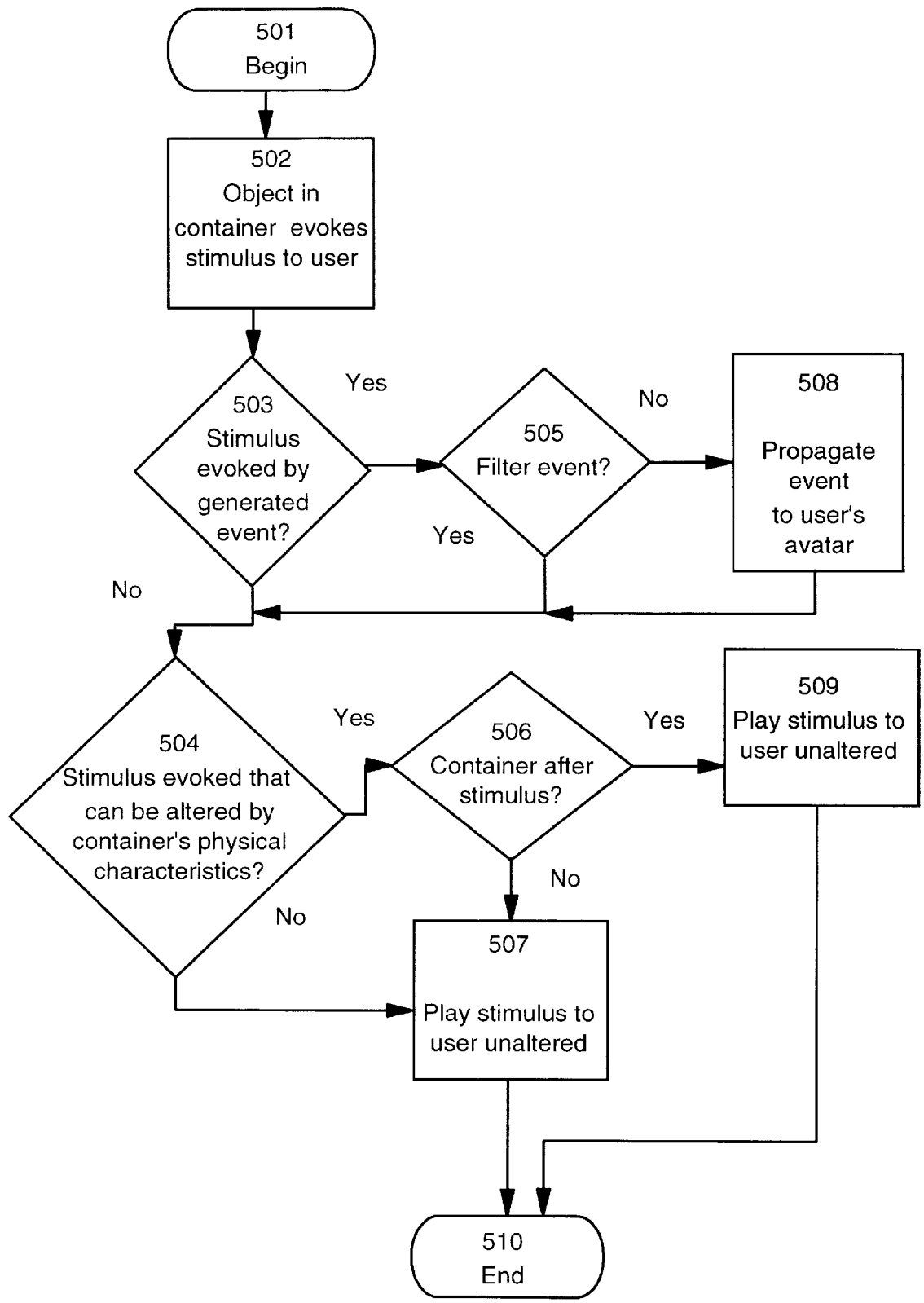
FIG. 5 depicts the flows required to filter events from a contained object to an avatar.

FIG. 5 represents the analog of FIG. 4 inward filtering, by describing the present invention's solution for outward filtering of events. Events from a contained object differ slightly from those generated by an avatar mainly because of the perspectives in a virtual world. Virtual worlds are generally designed for users to make selections and interact with objects as opposed to objects selecting users. The example begins with step 501 and an object inside a container such as a bicycle horn inside a bag. Step 502 represents the bicycle horn evoking some stimulus to USER1. For purposes of filtering it is important to note that some stimuli generate events that can be intercepted by a container while other stimuli involve no interaction events such as a shape change being a visual stimulus.

Decision step 503 determines if the stimulus generated an event. If so, step 505 represents the container deciding whether to filter the event from the contained object. If the event is not filtered then the stimulus flows to AVATAR1 (508) and possibly other pertinent objects in the vicinity. An example of this is the bicycle horn generating a sound event that could be filtered by a container which has sound-proof characteristics. A sound-proof container would not forward the sound stimulus to AVATAR1 whereas a paper bag may. Note that "event" and "stimulus" differ in that the event may flow beyond the container to a sound player object, whereas the stimulus reaches AVATAR1 as the sound gets executed by that sound player.

If decision step 503 does not encounter an event stimulus or event processing completes, then decision step 504 must determine if a stimulus occurred which can be filtered by the container's physical characteristics. The most pertinent example for this is a visual filtering by the container. Modifications of the bicycle horn's geometry could evoke a stimulus for USER1 to see the changes. However, such a geometry change does not involve events. Instead, filtering occurs relative to container characteristics such as its opaqueness. Decision step 506 determines whether to display the contained object stimulus based on the container's characteristics. With regard to opaqueness, step 506 determines if the container is a solid material which obstructs view of the contained object. If the view is altered, step 509 plays the stimulus with its altered result. Instances of such an altered result which are defined by the present invention include solid container walls, translucent container walls and windowed container walls. The windowed example is easiest to picture as a windowed envelope filtering visual stimulus from a contained object. The term "altered" is used here rather than "filtered" because of the visual example. Those technically skilled in the art will recognize that event stimuli can also involve altered events flowing beyond the container. An example of this is to alter the visual appearance of an object in a container of varied translucence. If decision step 506 determines that the stimulus is not to be altered, step 507 plays the stimulus unaltered. Playing the stimulus unaltered also occurs if decision step 504 determines that the stimulus is not one altered by the container's physical characteristics. Following the filtering of all necessary stimuli, step 510 represents the completion of contained object stimulus processing.

Figure 6:
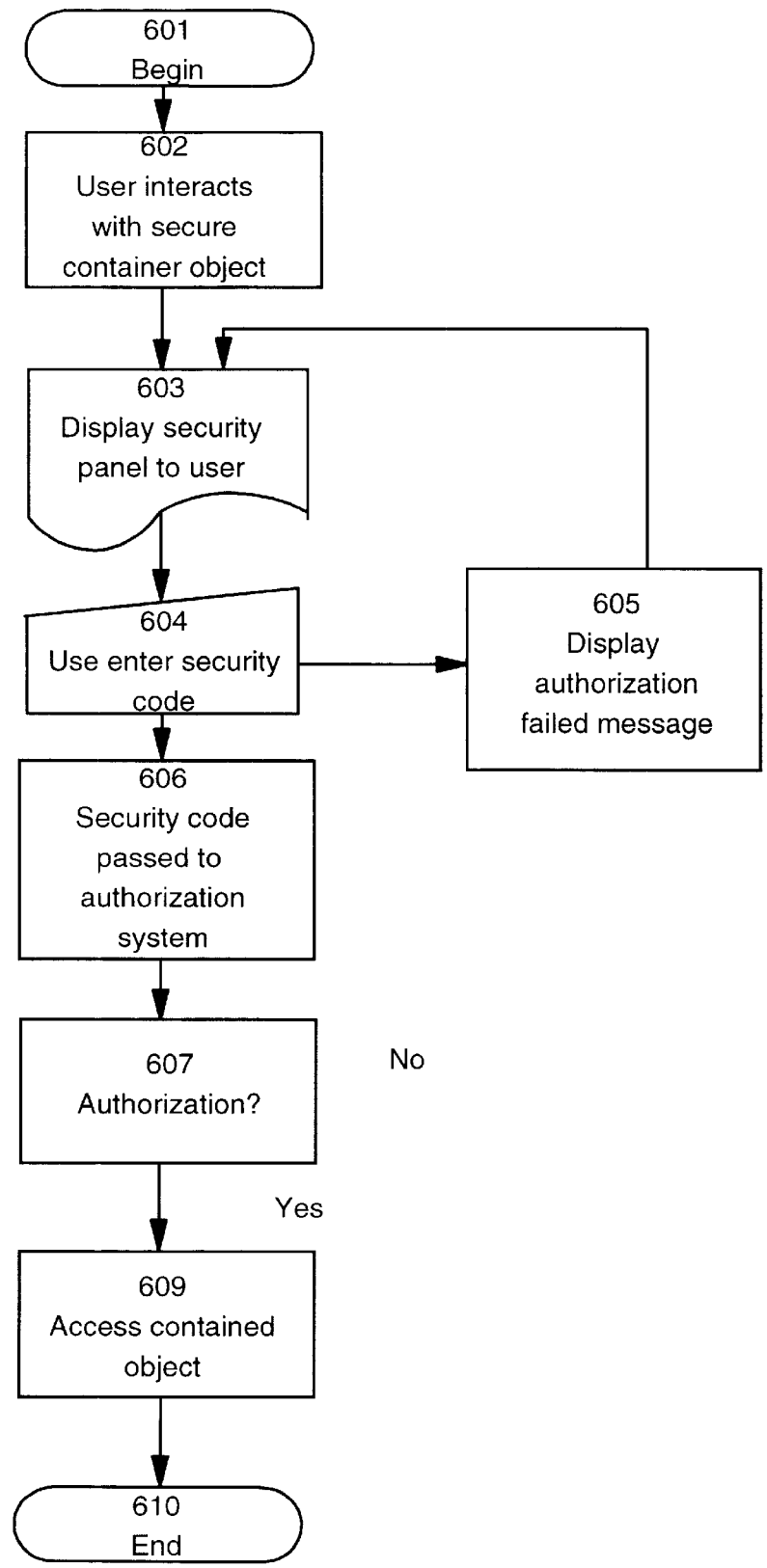
FIG. 6 depicts the flows required to condition object access on a security check.

FIG. 6 presents the preferred embodiment of the present invention when containers are used for security purposes. The process begins at step 601 and USER1 entering a virtual world with AVATAR1. When the USER1 attempts to interact with a secure container object (602) a preprogrammed security verification panel is displayed in step 603. Because containers can be used as information vehicles, this security panel could include a copyright licensing agreement or a password verification request. Those technically skilled in the art will recognize that numerous security checks could be incorporated with this container access sequence. Any such variation would simply derive from this security container framework. The approach presented for the preferred embodiment is not intended to limit the scope of the present invention relating to security mechanisms, but is merely given as an example.

Once the user enters a security code (604), the code is checked by an authorization system in step 606. This code could involve complex encryption keys or passwords or could be as simple as a person's signature to agree to copyright terms. Decision step 607 decides if the authorization succeeded and, if not, displays an authorization failed message (605). Following such a message, USER1 may be offered the same verification panel again (603). Such an approach of immediate retry is merely one possibility and is not intended to limit the scope of the present invention with regard to security mechanisms. If however, the authorization succeeds, step 609 proceeds to allow direct manipulation of the contained object. Note that container deletion is not necessary to allow direct interaction. It is possible the container would merely display an opening through which interaction could take place. At this point, interaction with the secure container is complete and USER1 can interact freely with the contained object (610). Those technically skilled in the art will recognize that access to the contained object can be accomplished with non-secure measures such as pointing device selection or timed container deletion. The present invention defines various such access methods and the preferred embodiment of secure access is used to demonstrate one of the more complex access methods. The approach presented by the preferred embodiment is not intended to limit the scope of the present invention relating to object access, but is merely given as an example.

What is claimed is:

1. A method for a giver virtual entity to deliver a virtual object to a receiver virtual entity using a container which contains said virtual object, said method of delivery comprising the steps of:

placing said virtual object into said container by said giver virtual entity;

delivering said container to said receiver virtual entity; and preventing access to said virtual object in said container by said receiver virtual entity until an access restriction of said container is satisfied.

2. A method as claimed in claim 1 wherein said giver virtual entity and said receiver virtual entity are each avatars which represent a user in a virtual world.

3. A method as claimed in claim 1 wherein one or more of said giver virtual entity and said receiver virtual entity are virtual worlds which manage a set of virtual objects.

4. A method as claimed in claims 1, 2 or 3 wherein said access restriction comprises waiting for expiration of a time-out period, after which said container is automatically removed programmatically, allowing said receiver virtual entity to access said virtual object.

5. A method as claimed in claims 1, 2 or 3 wherein said access restriction comprises awaiting a manual removal action of said container by said receiver virtual entity, allowing said receiver virtual entity to access said virtual object.

6. A method as claimed in claim 5 wherein said manual removal action is made available only after a time-out period.

7. A method as claimed in claim 5 wherein said manual removal action is accomplished by said receiver virtual entity satisfying a security check.

8. A method as claimed in claim 7 wherein said security check requires said receiver virtual entity to supply a password.

9. A method as claimed in claim 7 wherein said security check requires said receiver virtual entity to confirm agreement to a contract for use of said virtual object provided on said container.

10. A method as claimed in claims 1, 2 or 3 wherein said access restriction comprises awaiting a removal action of said container by said receiver virtual entity by an indication using a pointing device, allowing said receiver virtual entity to access said virtual object.

11. A method as claimed in claims 1, 2 or 3 wherein said container hides all or a portion of a visual appearance of said virtual object.

12. A method as claimed in claims 1, 2 or 3 wherein said container displays a set of information as configured for the container.

13. A method as claimed in claim 12 wherein said set of information comprises an advertisement.

14. A method as claimed in claim 12 wherein said set of information comprises a contract for use of said virtual object inside said container.

15. A method for an event generated by a handler avatar, handling a container, to be filtered by said container before reaching a virtual object inside said container, said method comprising the steps of:

generating said event by said handler avatar for transmission to said virtual object;

intercepting said generated event by said container;

determining by said container if said event can be forwarded to said virtual object;

forwarding said event by said container to said virtual object if said determining step allows it; and receiving said forwarded event by said virtual object.

16. A method for an event generated by a virtual object inside a container to be filtered by said container before reaching a handler avatar, handling said container, said method comprising the steps of:

generating said event by said virtual object for transmission to said handler avatar;

intercepting said generated event by said container;

determining by said container if said event can be forwarded to said handler avatar;

forwarding said event by said container to said handler avatar if said determining step allows it; and receiving said forwarded event by said handler avatar.

17. A computer system contained within a computer network, said computer network having multiple computers connected together using telecommunications mechanisms wherein a giver virtual entity delivers a virtual object to a receiver virtual entity using a container which contains said virtual object, said computer system comprising:

means for placing said virtual object into said container by said giver virtual entity;

means for delivering said container to said receiver virtual entity; and means for preventing access to said virtual object in said container by said receiver virtual entity until an access restriction of said container is satisfied.

18. A computer system as claimed in claim 17 wherein said giver virtual entity and said receiver virtual entity are each avatars which represent a user in a virtual world.

19. A computer system as claimed in claim 17 wherein one or more of said giver virtual entity and said receiver virtual entity are virtual worlds which manage a set of virtual objects.

20. A computer system as claimed in claims 17, 18 or 19 wherein said access restriction comprises means for waiting for expiration of a time-out period, after which said container is automatically removed programmatically, allowing said receiver virtual entity to access said virtual object.

21. A computer system as claimed in claims 17, 18 or 19 wherein said access restriction comprises means for awaiting a manual removal action of said container by said receiver virtual entity, allowing said receiver virtual entity to access said virtual object.

22. A computer system as claimed in claim 21 wherein said manual removal action is made available only after a time-out period.

23. A computer system as claimed in claim 21 wherein said manual removal action is accomplished by said receiver satisfying a security check.

24. A computer system as claimed in claim 23 wherein said security check requires said receiver virtual entity to confirm agreement to a contract for use of said virtual object provided on said container.

25. A computer system as claimed in claims 17, 18 or 19 wherein said access restriction comprises means for awaiting a removal action of said container by said receiver virtual entity by an indication using a pointing device, allowing said receiver virtual entity to access said virtual object.

26. A computer system as claimed in claims 17, 18 or 19 wherein said container hides all or a portion of an appearance of said virtual object.

27. A computer system as claimed in claims 17, 18 or 19 wherein said container displays a set of information as configured for the container.

28. A computer system as claimed in claim 27 wherein said set of information comprises an advertisement.

29. A computer system as claimed in claim 27 wherein said set of information comprises a set of directions for use of said virtual object inside said container.

30. A computer system as claimed in claim 27 wherein said set of information comprises a contract for use of said virtual object inside said container.

31. A computer system contained within a computer network, said computer network having multiple computers connected together using telecommunications mechanisms wherein an event generated by a handler avatar, handling a container, is filtered by said container before reaching a virtual object inside said container, said computer system comprising:

means for generating said event by said handler avatar for transmission to said virtual object;

means for intercepting said generated event by said container;

means for determining by said container if said event can be forwarded to said virtual object;

means for forwarding said event by said container to said virtual object if said means for determining allows it; and means for receiving said forwarded event by said virtual object.

32. A computer system contained within a computer network, said computer network having multiple computers connected together using telecommunications mechanisms wherein an event generated by a virtual object inside a container is filtered by said container before reaching a handler avatar, handling said container, said computer system comprising:

means for generating said event by said virtual object for transmission to said handler avatar;

means for intercepting said generated event by said container;

means for determining by said container if said event can be forwarded to said handler avatar;

means for forwarding said event by said container to said handler avatar if said means for determining allows it; and means for receiving said forwarded event by said handler avatar.

33. A computer program product on a computer-readable media wherein a giver virtual entity delivers a virtual object to a receiver virtual entity using a container which contains said virtual object, said computer system comprising:

computer-readable program code means for placing said virtual object into said container by said giver virtual entity;

computer-readable program code means for delivering said container to said receiver virtual entity; and computer-readable program code means for preventing access to said virtual object in said container by said receiver virtual entity until an access restriction of said container is satisfied.

34. A computer program product as claimed in claim 33 wherein said giver virtual entity and said receiver virtual entity are each avatars which represent a user in a virtual world.

35. A computer program product as claimed in claim 33 wherein one or more of said giver virtual entity and said receiver virtual entity are virtual worlds which manage a set of virtual objects.

36. A computer program product as claimed in claims 33, 34 or 35 wherein said access restriction comprises computer-readable program code means for waiting for expiration of a time-out period, after which said container is automatically removed programmatically, allowing said receiver virtual entity to access said virtual object.

37. A computer program product as claimed in claims 33, 34, or 35 wherein said access restriction comprises computer-readable program code means for awaiting a removal action of said container by said receiver virtual entity by an indication using a pointing device, allowing said receiver virtual entity to access said virtual object.

38. A computer program product as claimed in claims 33, 34 or 35 wherein said container hides all or a portion of an appearance of said virtual object.

39. A computer program product as claimed in claims 33, 34 or 35 wherein said access restriction comprises computer-readable program code means for awaiting a manual removal action of said container by said receiver virtual entity, allowing said receiver virtual entity to access said virtual object.

40. A computer program product as claimed in claim 34 wherein said manual removal action is made available only after a time-out period.

41. A computer program product as claimed in claim 39 wherein said manual removal action is accomplished by said receiver satisfying a security check.

42. A computer program product as claimed in claim 41 wherein said security check requires said receiver virtual entity to supply a password.

43. A computer program product as claimed in claim 41 wherein said security check requires said receiver virtual entity to confirm agreement to a contract for use of said virtual object provided on said container.

44. A computer program product on a computer-readable media wherein an event generated by a handler avatar, handling a container, is filtered by said container before reaching a virtual object inside said container, said computer system comprising:

computer-readable program code means for generating said event by said handler avatar for transmission to said virtual object;

computer-readable program code means for intercepting said generated event by said container;

computer-readable program code means for determining by said container if said event can be forwarded to said virtual object;

computer-readable program code means for forwarding said event by said container to said virtual object if said computer-readable program code means for determining allows it; and computer-readable program code means for receiving said forwarded event by said virtual object.

45. A computer program product on a computer-readable media wherein an event generated by a virtual object inside a container is filtered by said container before reaching a handler avatar, handling said container, said computer system comprising:

computer-readable program code means for generating said event by said virtual object for transmission to said handler avatar;

computer-readable program code means for intercepting said generated event by said container;

computer-readable program code means for determining by said container if said event can be forwarded to said handler avatar;

computer-readable program code means for forwarding said event by said container to said handler avatar if said computer-readable program code means for determining allows it; and computer-readable program code means for receiving said forwarded event by said handler avatar.

* * * * *